United States Patent [19]

Beachy et al.

[11] Patent Number: 5,481,534
[45] Date of Patent: Jan. 2, 1996

[54] DATA PACKET SWITCH APPARATUS AND METHOD WITH ENHANCED CHARGE ASSESSMENT CAPABILITY

[75] Inventors: Shawn A. Beachy, Gahanna; William W. Kean, Pataskala; DeCarla J. Morgan, Reynoldsburg; Ani A. Okafor, Columbus, all of Ohio

[73] Assignee: AT&T Corp., Murray Hill, N.J.

[21] Appl. No.: 766,871

[22] Filed: Sep. 27, 1991

[51] Int. Cl.⁶ .................................................. H04L 19/56
[52] U.S. Cl. ..................... 370/60; 370/94.1; 379/114
[58] Field of Search .............................. 370/60, 94.1, 62, 370/110.1, 94.2, 17; 379/111, 112, 91, 114, 115, 116, 130, 131, 126–128

[56] References Cited

U.S. PATENT DOCUMENTS

| | | | |
|---|---|---|---|
| 4,027,104 | 5/1977 | Levitt et al. | 379/115 |
| 4,191,860 | 3/1980 | Weber | 179/18 |
| 4,525,601 | 6/1985 | Burnick et al. | 379/119 |
| 4,554,659 | 11/1985 | Blood et al. | 370/88 |
| 4,611,094 | 9/1986 | Asmuth et al. | 379/113 |
| 4,683,563 | 7/1987 | Rouse et al. | 370/16 |
| 4,706,242 | 3/1986 | Harland | 370/60 |
| 4,757,267 | 7/1988 | Riskin | 379/113 |
| 4,868,758 | 9/1989 | Kokubu | 379/114 |
| 4,933,931 | 6/1990 | Kokubo | 370/60 |
| 5,003,584 | 3/1991 | Benyacar et al. | 379/119 |
| 5,008,929 | 4/1991 | Olsen et al. | 379/112 |
| 5,140,588 | 8/1992 | Danner | 370/17 |
| 5,187,710 | 2/1993 | Chau et al. | 370/110.1 |

FOREIGN PATENT DOCUMENTS

0472318A2  2/1992  European Pat. Off. .

Primary Examiner—Wellington Chin
Assistant Examiner—Ajit Patel
Attorney, Agent, or Firm—Dwight A. Marshall; Charles L. Warren

[57] ABSTRACT

Apparatus and method of operation for transporting data packets between data systems located in telephone local access transport areas and for implementing enhanced services to control operation of a telephone local access transport area switching network to interconnect calling and called parties in accordance with requested ones of the enhanced services. The apparatus is interconnected with the data systems and switching systems and is responsive to receipt of dam packets from originating data systems requesting transport of data packets to destination data systems and from switching systems requesting an enhanced service for assessing a charge for use of the apparatus by each received data packet. A central processor accumulates assessed charges incurred by each data system and switching system for data packet use of the apparatus in transmitting transport data packets to destination data systems and for providing enhanced services to switching systems to control the switching systems to interconnect the calling and called parties in accordance with requested enhanced services to be billed to the telephone local access transport area.

16 Claims, 6 Drawing Sheets

| | | 10400 |
|---|---|---|
| RECORD 1 (104001) | TIME | DATE |
| | ORIGINATING SYSTEM ||
| | DESTINATION SYSTEM ||
| | SERVICE TYPE REQUESTED | SERVICE DESCRIPTION |
| | ORIGINATING LATA | DESTINATION LATA |
| | OPTIONAL CHARGE ||
| RECORD 2 (104002) | 04:01 | 5/2/91 |
| | DATA SYSTEM 25 ||
| | DATA SYSTEM 55 ||
| | T | |
| | 2 | 5 |
| RECORD 3 (104003) | 04:08 | 5/2/91 |
| | SWITCH SYSTEM 20 ||
| | SWITCH SYSTEM 20 ||
| | ES | 800 SERVICE |
| | 2 | 2 |
| | 15.00 ||
| RECORD N (104004) | 04:09 | 5/2/91 |
| | SWITCH SYSTEM 21 ||
| | SWITCH SYSTEM 21 ||
| | ES | 900 SERVICE |
| | 2 | 2 |
| | 16.00 ||

| LATA | DATE | TIME | SERVICE TYPE | DATA SYSTEM | SWITCH SYSTEM | CHARGE |
|---|---|---|---|---|---|---|
| 2 | 5/2/91 | 04:01 | T | 25 | | 1.00 |
| | | 04:08 | ES 900 | | 20 | 15.00 |
| | | 04:09 | ES 800 | | 21 | 16.00 |
| | | | | | TOTAL | 32.00 |

DATA PACKET SWITCH APPARATUS AND METHOD WITH ENHANCED CHARGE ASSESSMENT CAPABILITY

TECHNICAL FIELD

The invention relates to data packet switching apparatus and in particular to apparatus and method for accessing charges for packet use of the apparatus.

BACKGROUND AND PROBLEM

Telecommunication interconnection networks serve to interconnect telephone companies local access transport area networks such that a calling party located within a telephone company local access transport area network and having subscribed to a telecommunication interconnection network service may be connected by the telecommunication interconnection network to a called party located in a different local access transport area network of the same telephone company or of a different telephone company. Typically, a telecommunication interconnection network may have a large number of switching systems that are coupled by access lines with telephone company local access transport area network switching systems. The telecommunication interconnection network switching systems are also interconnected with each other by trunks and by data links to a common channel system. The common channel system is a data packet network and serves to control the telecommunication interconnection network switching systems to selectively interconnect trunks with access lines to couple a calling party with a called party.

The telecommunication interconnection network also provides enhanced services to a network user by use of network control points. A network control point may be, although not necessarily limited thereto, considered as a part of the common channel system. Typically, a network control point comprises a computer system configured to provide enhanced services, such as 800 and 900 service, to users of the network. In 800 service operation, telephone company calling party may place a call to a called party having subscribed to 800 service by dialing the 800 number of the called party. The calling party is connected via the telephone company local access transport area network over an access line with a switching system of the telephone communication network. Upon receipt of the called 800 number, the telephone communication network switching prepares a data packet identifying the called 800 number which is transmitted over data links of the common channel system to the network control point. The receiving network control point translates the received called party number into information that is transmitted back to the telephone communication network switching system. The information controls the telephone communication network switching systems to interconnect one of the trunks with the access lines to establish a connection between the calling party and the called party identified by the 800 number.

It is desirable that the enhanced services available to users of the telecommunication interconnection network also be made available to telephone company customers located in a local access transport area network. Thus, telecommunication interconnection network enhanced services, such as 800 and 900 type services, could be offered customers within a local access transport area network so that a calling party located within the local access transport area network may by dialing the appropriate called party number be connected by local access transport area network switching systems with the called party in accordance with provisions of the enhanced services. In addition, telephone local access transport areas also serve data systems that exchange data packets with data systems in the local access transport area and with data systems located in other local transport areas. In contrast to sending data messages by voice telephone or leased data lines, it is desirable that the data systems be coupled with a network apparatus arranged to transport data packets between originating and destination data systems.

A problem arises that in the present network structure data and selected local access transport area switching systems are connected by access lines with certain telecommunication interconnection network switching systems. A calling party dialed number must be transmitted over an established access line connection to a telecommunication interconnection network switching system to initiate a request for enhanced services. Another problem arises in that charges are accessed against a call connection established between the calling and called parties. No provision is currently available to charge for data packet use of or for the transport of a data package through the telecommunication interconnection network common channel system.

SOLUTION

The foregoing problems are solved by apparatus equipped with enhanced services and a method of operation thereof for transporting data packets between data systems located in telephone local access transport areas and for implementing enhanced services to control operation of a telephone local access transport area switching network to interconnect calling and called parties in accordance with the requested services. The apparatus has nodes for terminating data links each interconnecting data systems and switching systems of a telephone local access transport area with the apparatus and are responsive to receipt of data packets for identifying transport and enhanced service requests and telephone local access transport area data systems and switching systems having generated the received data packets. The node apparatus records transport and enhanced service requests of the received data packets and the telephone local access transport area data system and switching system identifies for data packets received during a predetermined interval of time. Central processing apparatus coupled with the nodes interrogates the nodes during the predetermined interval of time and stores the node recorded transport and enhanced service requests and telephone local access transport area data system and switching system identities. The central processor determines charge for use of the apparatus by each received data packet in accordance with the stored transport and enhanced service requests and telephone local access transport area data and switching system identifies and assesses the determined charge against each received data packet. A total of the assessed data packet apparatus use charges incurred by each data system and switching system of a telephone local access transport area is accumulated and billed to a telephone local access transport area for data packet use of the apparatus. The apparatus responds to receipt of a transport data packet requesting transport by transmitting the transport data packet to a telephone local access transport area destination data system and to receipt of a data packet requesting an enhanced service by generating another data packet identifying switching system interconnection information required to control a telephone local access transport area switching system to interconnect calling and called parties in accordance with the identified enhanced service and transmitting the generated data packet

DETAILED DESCRIPTION

Figure 1:
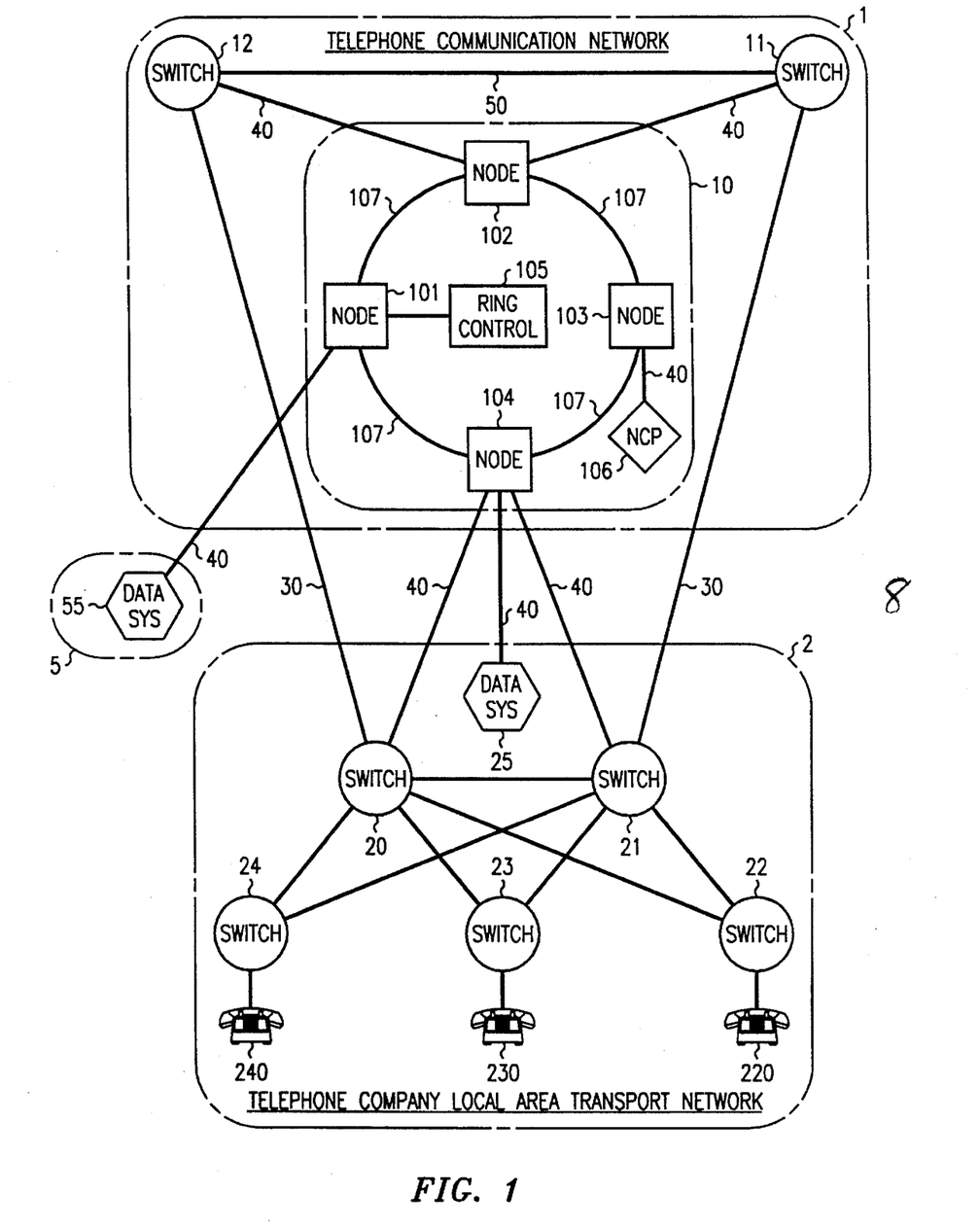
FIG. 1 illustrates packet charge apparatus embodying the principles of the invention.

In an exemplary embodiment of the invention, telecommunication interconnection network 1 serves to interconnect telephone companies local access transport area networks, hereinafter referred to as LATAS, such as telephone company LATA 2, LATA 5, in order that a calling party located within a telephone company LATA and having subscribed to the telecommunication interconnection network service may be connected by telecommunication interconnection network 1 to a called party located in a different LATA of the same telephone company or of a different telephone company. Typically, telecommunication interconnection network 1 may have a large number of switching systems 11, 12 some of which are coupled by voice access lines 30 with telephone company LATA switching systems 20, 21. The telecommunication interconnection network switching systems 11, 12 are also interconnected with each other by voice trunks 50 and by data links 40 to a common channel system 10. Common channel system 10 may be a packet network and serves to control telecommunication interconnection network switching systems 11, 12 to selectively interconnect voice trunks 50 with voice access lines 30 to establish a telephone path coupling a calling party with a called party.

Telecommunication interconnection network 1 also provides enhanced services to network users by use of network control points such as network control point 106. A network control point may be, although not necessarily limited thereto, a part of common channel system 10. Typically, a network control point, hereinafter referred to as enhanced service apparatus, comprises a computer system configured to provide enhanced services, such as 800 and 900 service, to users of telecommunication interconnection network. In 800 service operation, a telephone company calling party may place a call to a called party having subscribed to 800 service by dialing the 800 number of the called party. Common channel system 10 may, although not necessarily limited thereto, includes a type of asynchronous network as disclosed by M. L. Blood et al. in U.S. Pat. No. 4,554,659 or by D. M. Rouse et al. in U.S. Pat. No. 4,683,563. This type of network need not be described in detail for an understanding of the invention but sufficient to say that the network has a number of nodes 101 through 104 interconnected by directional transmission paths, such as ring transmission path 107, to form a ring of nodes 101 through 104 wherein ones of the nodes are intended to couple data links 40 to the network in order that data may be selectively exchanged between data links 40. A node 101, 102, 103, 104, FIG. 2, may be connected by a data bus 1012, 1022, 1032, 1042, with a node processor 1010, 1020, 1030, 1040 and line interface unit 1011, 1021, 1031, 1041 arranged to terminate data links 40 used to couple data systems 25, 55, switching systems 20, 21, FIG. 1, of telephone company LATA 2, 5 and enhanced service apparatus 106 with the network ring transmission paths 107. In addition to coupling data links 40 with the network, some nodes, such as node 101, interconnects ring control 105, FIG. 2, with network transmission paths 107 via node processor 1010 and line interface unit 1011.

Node processors, such as node processor 1040 and ring control 105, comprises processors and computers. The processors and computers may, although not limited thereto, be any one of a number of different computers, such as an AT&T 3B2-400 and 3B2-310 simplex or duplex computer or microprocessor chips, and need not be discussed in detail for an understanding of the invention. Similarly, ring control 105 may be a computer such as an AT&T 3B-20 simplex or duplex computer. Such processors and computers, for example computer 60, FIG. 3, need not be described in detail for an understanding of the invention and in general have a central processor unit 600, memory unit 601, and an interface unit 603 each connected by address, data and control leads to a bus 602. Interface unit 603 is coupled data links 40, FIG. 1, extending respectively to telephone LATA data systems 25, 55 and switching systems 20, 21 with bus 602, FIG. 3, so that data may be exchanged with central processor unit 600, memory unit 601, and storage devices 604, 605, 606. Storage devices 603, 604, 605 may be any one of a number of well-known storage devices, such as disk stores or tape drives, wherein information may be read from and written into the storage devices by central processor 600.

Common channel system 10, FIG. 1, may, in one embodiment of the invention, be apparatus 10 arranged to transport data packets between an originating data system 25 located in telephone LATA 2 and a destination data system 55 located in LATA 5. In addition, apparatus 10 is also arranged to implement enhanced services, such as 800 and 900 service, to control operation of the LATA 2 telephone switching network to interconnect calling party 240 with called party 220 in accordance with a requested one of the enhanced services provided by enhanced service apparatus 106 of apparatus 10. Nodes, such, as nodes 104, 101, may terminate ones of data links 40 interconnecting data systems 25 and 55 of LATAS 2 and 5, respectively, with apparatus 10 while other data links 40 interconnect apparatus 10 with telephone switching systems 20 and 21 of LATA 2. Still other data links 40 interconnect node 103 with enhanced service apparatus 106.

In operation, an originating data system, such as LATA 2 data system 25, generates a data packet having information therein requesting that transport service be provided by apparatus 10 to transport the data packet to a destination data system 55 of LATA 5. Similarly, LATA 2 telephone switching system 20 may, in response to a request to calling party located at telephone station 240, generate a data packet requesting an enhanced service to be provided by apparatus 10 so that the calling party of telephone station 240 may be interconnected with a called party at telephone station 220 in accordance with the provisions of the requested enhanced service. In one embodiment of the invention, node 104 responds to receipt of a data packet from originating data system 25 and a data packet from switching system 20 by assessing a charge for use of apparatus 10 by each received data packet in accordance with the transport and enhanced service requests of each received data packet.

Ring control 105, coupled with nodes 101, 102, 103, 104, accumulates a total of the node assessed charges incurred by each data system 25 and switching systems 20, 21 of a telephone local access transport area, such as LATA 2, to be billed to LATA 2 for data packet use of apparatus 10.

In operation, originating data system 25 generates a transport data packet requesting transport of the data packet by apparatus 10 to destination data system 55. The data packet is transmitted over data link 40, FIG. 2, to interface unit 1041 of node 104 and by bus 1042 to node processor 1040. Node processor 1040, which functions as a local processing means, responds to receipt of the dam packet by identifying the requested transport service and the identity of LATA 2 originating data system 25 having generated the data packet from information contained within the received data packet. Node processor 1040 records the transport service request and the identity of originating data system 25. Transport and enhanced service requests and the identities of the LATA data and switching system having originated the received data packets are recorded for all data packets received during predetermined intervals of time.

Centralized ring control 105 is connected by a data link with interface unit 1011 and bus 1012 to node 101. During the predetermined intervals of time, ring control 105 interrogates each node 101, 102, 103, 104 by transmitting an interrogation data packet to node processor 1010. Node processor 1010 writes the interrogation data packet onto ring transmission paths 107 and the interrogation data packet is sequentially transmitted to each node 101, 102, 103, 104. Upon reaching node 104, the interrogation data packet is read off ring transmission paths 107 into node processor 1040. Node processor 1040 responds to receipt of the interrogation data packet by preparing a response data packet listing all of the transport and enhanced services and the recorded identities of the LATA data systems and switching systems having generated the transport and service requests. The response data packet is written by node processor 1040 onto ring transmission paths 107 and transmitted to node 101 and over bus 1012 and interface unit 1011 to ting control 105.

Figure 2:
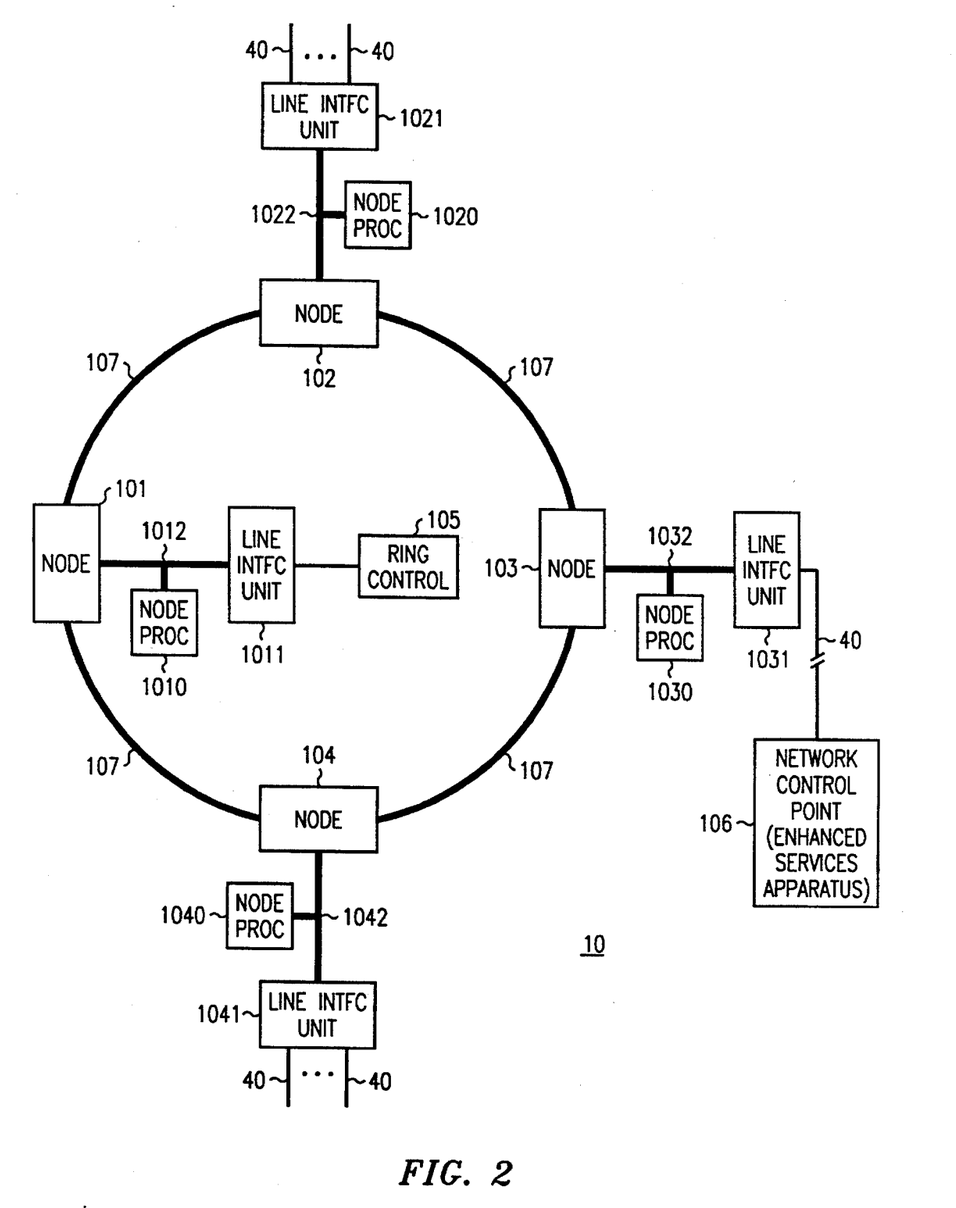
FIG. 2 sets forth illustrative network apparatus used with the packet charge apparatus of FIG. 1 for collecting and recording packet charge billing information.
Figure 3:
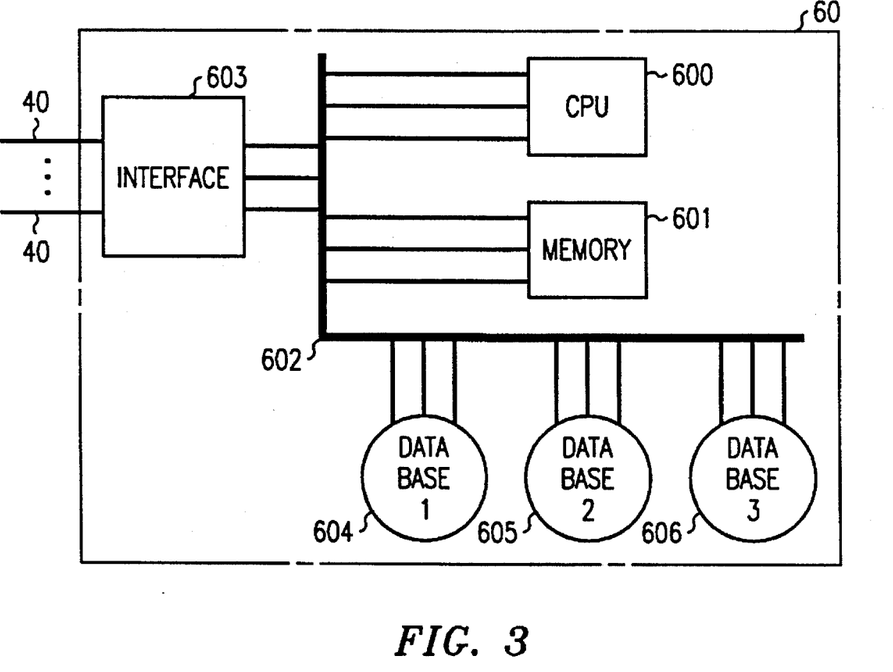
FIG. 3 illustrates the functional apparatus relationship of the node processor and ring control apparatus set forth in FIG. 2.

Ring control 105 responds to receipt of the response data packet by storing the node recorded transport and enhanced service requests and the LATA data and switching system identities into storage devices 604, 605, 606, FIG. 3, of the process of ring control 105. Central processor unit 600 of ring control 105 reads the stored information from storage devices 604, 605, 606 into memory unit 601 via bus 602. In one embodiment of the invention, a node processor, such as node processor 1040, FIG. 2 may assess a charge for packet use of apparatus 10 and record the assessed charge information along with the recorded transport and enhanced service requests and the identities of the LATA data and switching systems. Subsequently, the charge information is transmitted in the response data packet to ting control 105. In another embodiment of the invention, ring control 105 evaluates the information previously received from the nodes and determines a charge for use of apparatus 10 by each received data packet in accordance with the stored transport and enhanced service requests and LATA data and switching system identities and assesses the determined charge against each received data packet. The ring node central processing unit accumulates a total of the determined and assessed data packet apparatus use charges incurred by each LATA data and switching system. The packet use charges are billed to the appropriate LATA and transmitted to the LATA for data packet use of apparatus 10.

Node processor 1040, FIG. 2, further responds to receipt of a transport data packet originated by LATA 2 originating data system 25, FIG. 1, and intended for LATA 5 destination data system 55 by writing the transport data packet onto transmission paths 107. The transport data packet is transmitted to node 101 and read into the node processor 1010 of node 101 wherein it is then transmitted over data link 40, FIG. 1, to LATA 5 destination data system 55. Thus, apparatus 10 responds to receipt of a transport data packet received from originating data system 25 by assessing a charge to be billed to the LATA 2 for packet use of apparatus 10 and transporting the received data packet to destination data system 55. In addition to transporting data packets between data systems located in different LATAS, apparatus 10 may also be used to transport data packets between data systems located in the same LATA and to bill the LATA for packet use of apparatus 10.

Upon receiving a data packet from LATA 2, switching system 20, requesting an enhanced service node processor 1040, FIG. 2, further responds thereto by preparing an address identifying enhanced service apparatus 106 and inserting the address in the data packet. The enhanced service data packet is then written onto transmission paths 107 and transmitted to node 103. The enhanced service data packet is read into the node processor of node 103 and transmitted over data link 40 to enhanced service apparatus 106. Enhanced service apparatus 106 responds to receipt of the enhanced service data packet by translating the request for an enhanced service into control information used to control the LATA 2 switching network to interconnect calling and called telephone stations in accordance with the requested enhanced service request.

In response to the enhanced service request of switching system 20, enhanced service apparatus 106 generates a data packet containing the interconnect information, addresses the generated data packet to the requesting LATA 2 switching system 20 and transmits the generated data packet to node 103. Node 103 writes the received data packet onto ring transmission paths 107 for transmission to node 104. Upon receiving the generated data packet, node 104, via node processor 1040 and line interface unit 1041, FIG. 1, transmits the generated data packet over data link 40 to the enhanced service requesting LATA 2 switching system 20. Switching system 20 responds to the received generated data packet by interconnecting calling telephone station 240 with called telephone station 220 in accordance with the provisions of the requested enhanced service.

Figure 4:
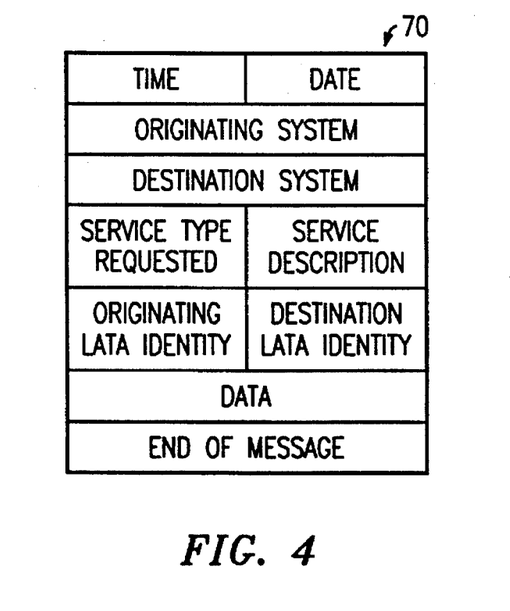
FIG. 4 sets forth a typical data packet requesting transport and enhanced service provided by the packet apparatus of FIG. 1.

In operation, originating data system 25 and switching systems 20, 21 generate a data packet 70, FIG. 4, requesting either the transport of data packet 70 to a destination data system 55 or the provision of an enhanced service. Data packet 70 includes the time and date of generation and identifies both the originating and destination data and switching systems. In addition, data packet 70 identifies the type of service requested such as transport and enhanced service and in the case of enhanced service, identifies the specific type of requested enhanced service, such as 800 and 900 service. Originating data packet 70 further identifies both the originating and destination LATAS, contains data generated by the originating data and switching systems, and an end-of-message indication.

Figure 7:
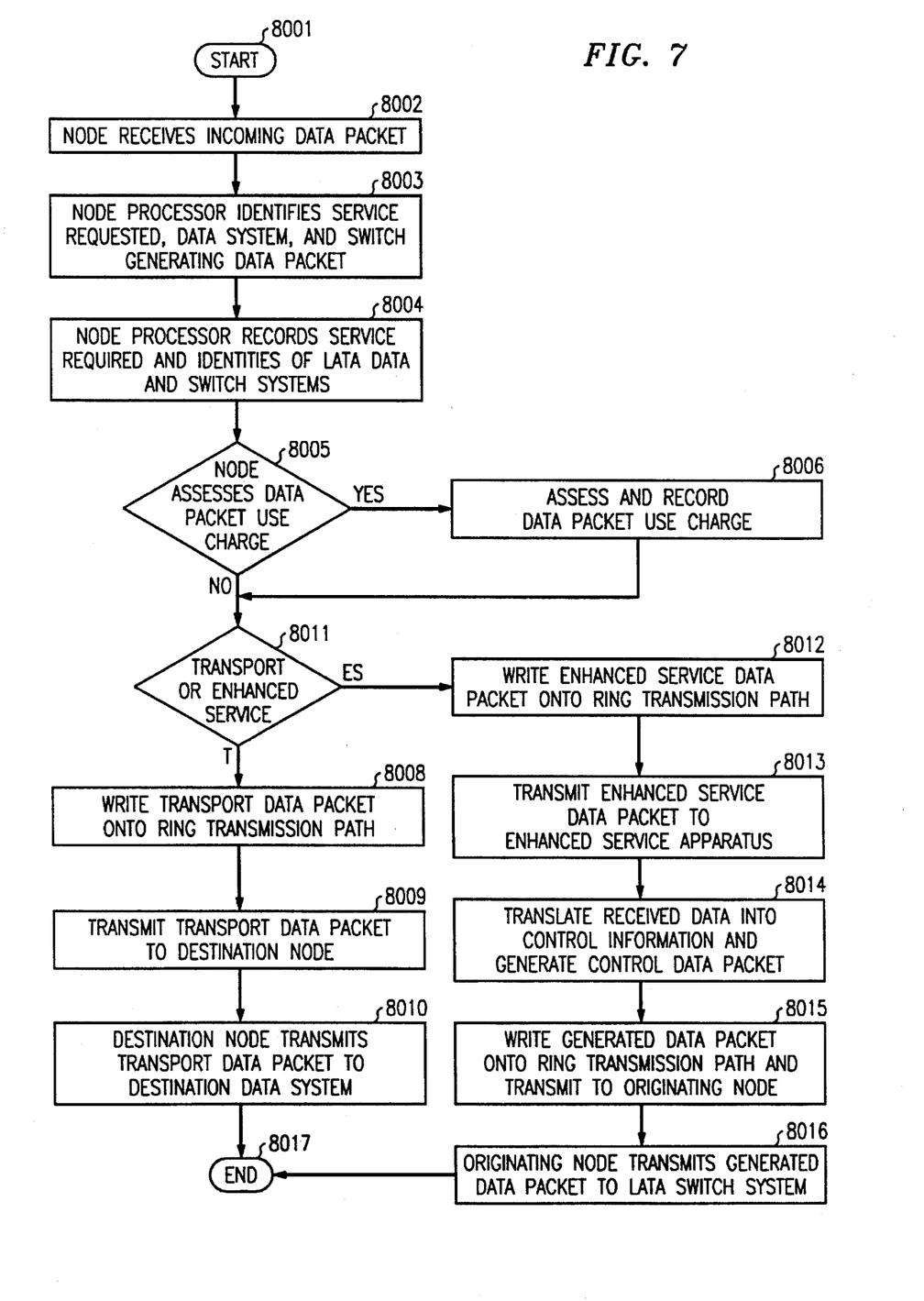
FIGS. 7 and 8 illustrate a flow chart of the operation of the packet network and apparatus set forth in FIGS. 1 and 2 in accordance with the principles of the invention.

The operation of apparatus 10 is initiated, FIG. 7, step 8001, when a data packet 70 is transmitted by originating data and switching systems 25, 20, 21, FIG. 1, over data links 40 to apparatus 10. A node, such as node 104, receives incoming data packets from originating data and switching systems, FIG. 7, step 8002. Node processor 1040, FIG. 2, identifies the requested transport and enhanced service and the identities of data and switching systems having originated the data packet from data of the received data packet 70, step 8003. Node processor 1040, FIG. 2, records the identified transport and enhanced service requests and the data and switching system identities for all data packets received at the node during a predetermined interval of time, FIG. 7, step 8004. The received data packet 70 information is recorded in a record, such as record 10400, FIG. 5. Record 104001 records the date and time data packet 70 was received by node processor 1040. In addition; node processor 1040 records the identity of the originating and destination systems, the type of service required and a description of the requested service. Record 10400 also identifies the originating and destination LATAS wherein the data and switching systems are located and may assess an optional charge at the node for data packet use of apparatus 10. Upon receiving a transport request from data system 25, FIG. 1, for transport of a received data packet 70 to destination node 55, node processor 1040 establishes a node record 104002, FIG. 5, recording a time of 0401 AM and a date of May 2, 1991 that the transport data packet was received. Record 104002 further records that data packet 70 was received from originating data system 25 and that the received data packet is intended for destination data system 55. Transport service is requested and data system 25 is located in originating LATA 2 while destination data system 55 is located in destination LATA 5. In one embodiment of the invention, data packet charge for use of apparatus 10 is assessed by ring control 105. Accordingly, no charge is recorded for this embodiment in record 104002.

Figure 5:
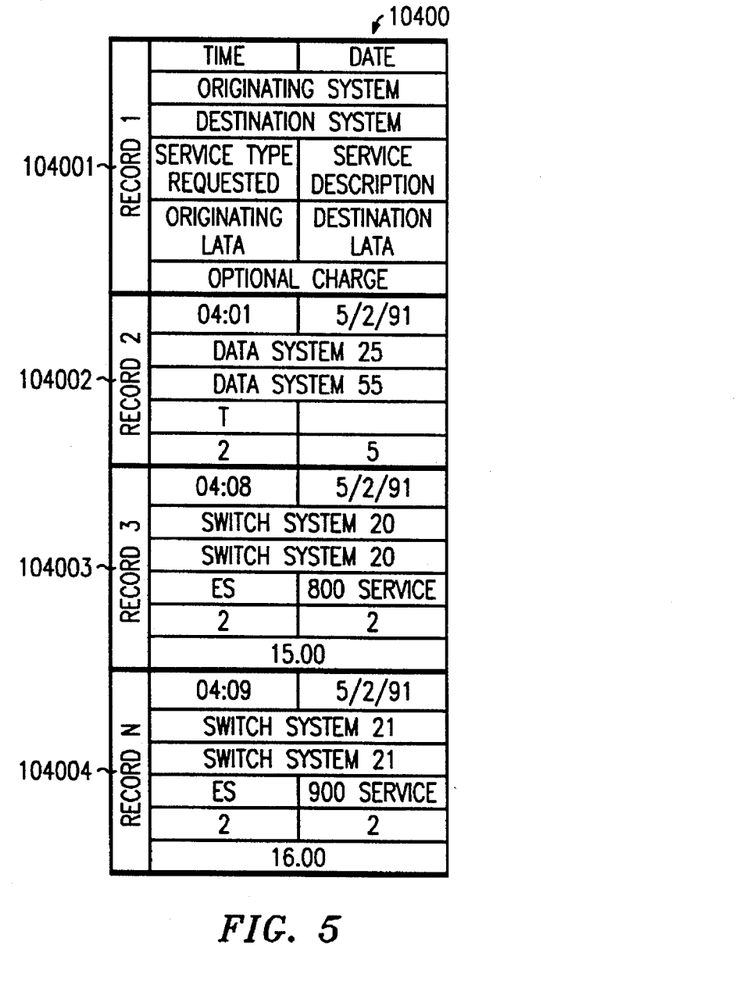
FIGS. 5 and 6 set forth illustrative tables showing the collection of packet charge billing information collected by node and ring control processors of the packet charge apparatus of FIG. 2.

Record 104003 records that a data packet 70 was received at 0408 AM on May 2, 1991 from originating switching system 20 and that a data packet in response thereto is to be returned to switching system 20 also identified as the destination switching system. Switching system 20 has requested enhanced service wherein the enhanced service is identified as 800 service and the originating and destination LATA is LATA 2. In another embodiment of the invention, node processor 1040 assesses a charge of $15.00 for packet use of apparatus 10. Record 104004 indicates that another incoming data packet 70 is received on May 2, 1991 at 0409 AM from LATA 2 switching system 21 requesting an enhanced service described as 900 service. Both the originating and destination LATAS are identified as LATA 2 and a charge of $16.00 is assessed data packet 70 for use of apparatus 10.

After node processor 1040 has recorded service requests and the identities of the LATA data and switching systems, FIG. 7, step 8004, node processor 1040 determines if the node is to assess a data packet use charge, step 8005. When it is determined that node 1040 is to assess the charge, node processor 1040, step 10400, assesses and records the data packet use charge in the appropriate record 10400, FIG. 5, and advances to step 8011, FIG. 7. When it is determined that node 104 is not to assess the data packet use charge, step 8005, node processor 1040 advances directly to step 8011 to ascertain the type of service required by the received data packet.

When transport service has been requested, step 8011, node processor 1040, step 8008, writes the transport data packet 70 onto ring transmission paths 107, FIG. 2. The transport data packet is transmitted via ring transmission paths 107 to node 101 and written into node processor 1011, FIG. 7, step 8009. Node processor 1011 transmits the received transport data packet 70, FIG. 1, via data link 40 to LATA 5 destination data system 55.

In response to the enhanced service request of switching system 20, FIG. 7, step 8011, node processor 1040 responds thereto by preparing an address identifying enhanced service apparatus 106 and inserts the address in the data packet. The enhanced service data packet is then written onto transmission paths 107, steps 8012, 8013 and transmitted over ring transmission paths 107 to node 103, FIG. 2. The enhanced service data packet is read off ring transmission paths 107 into node processor 1030 of node 103 and transmitted over data link 40 to enhanced service apparatus 106. Upon receiving the data packet, enhanced service apparatus 106, FIG. 7, step 8014, translates the enhanced service request into control information used to control LATA 2 switching system to interconnect calling and called telephone stations 240, 220 in accordance with the requested enhanced service.

As earlier set forth, enhanced service apparatus 106 generates a data packet containing the interconnect information, step 8014, and transmits the generated data packet to node 103. Node 103 writes the received generated data packet onto ring transmission paths 107 for transmission to node 104, step 8015. Node 104 transmits the generated data packet over data link 40 to LATA 2 switching system 20, step 8016. Switching system 20, FIG. 1, responds to the received generated data packet by interconnecting calling telephone station 240 with called telephone station 220 in accordance with the provisions of the requested enhanced service. After completing the requested services, the method then is ended, step 8017.

Each node processor records the data of incoming data packets for a predetermined period of time. The length of time depends upon the amount of incoming and outgoing data packet traffic and the through-put capabilities of the node processor. At least once during the predetermined interval of time, ring control 105, FIG. 1, collects the recorded data packet information from all of the nodes to accumulate data packet use charges for LATA use of apparatus 10. Ring control 105, FIG. 2, interrogates ring nodes 101, 102, 103, 104, FIG. 8, step 9002, by preparing a node interrogation data packet and transmitting the interrogation data packet to node processor 1010, FIG. 2. Node processor 1010 addresses the received interrogation data packet to each node and writes the interrogation data packet onto transmission paths 107. Upon receipt of the interrogation data packet, each node processor, for example node processor 1040, generates a response data packet, FIG. 8, step 9003, containing all the data packet information recorded by node 104 within the predetermined interval of time. The generated response data packet is addressed to ting control 105, FIG. 2, and written onto ring transmission paths 107, FIG. 8, step 9004. Each node response data packet, FIG. 2, is transmitted to node 101 and to ring control 105 via data bus 1012 and line interface unit 1011.

Figure 8:
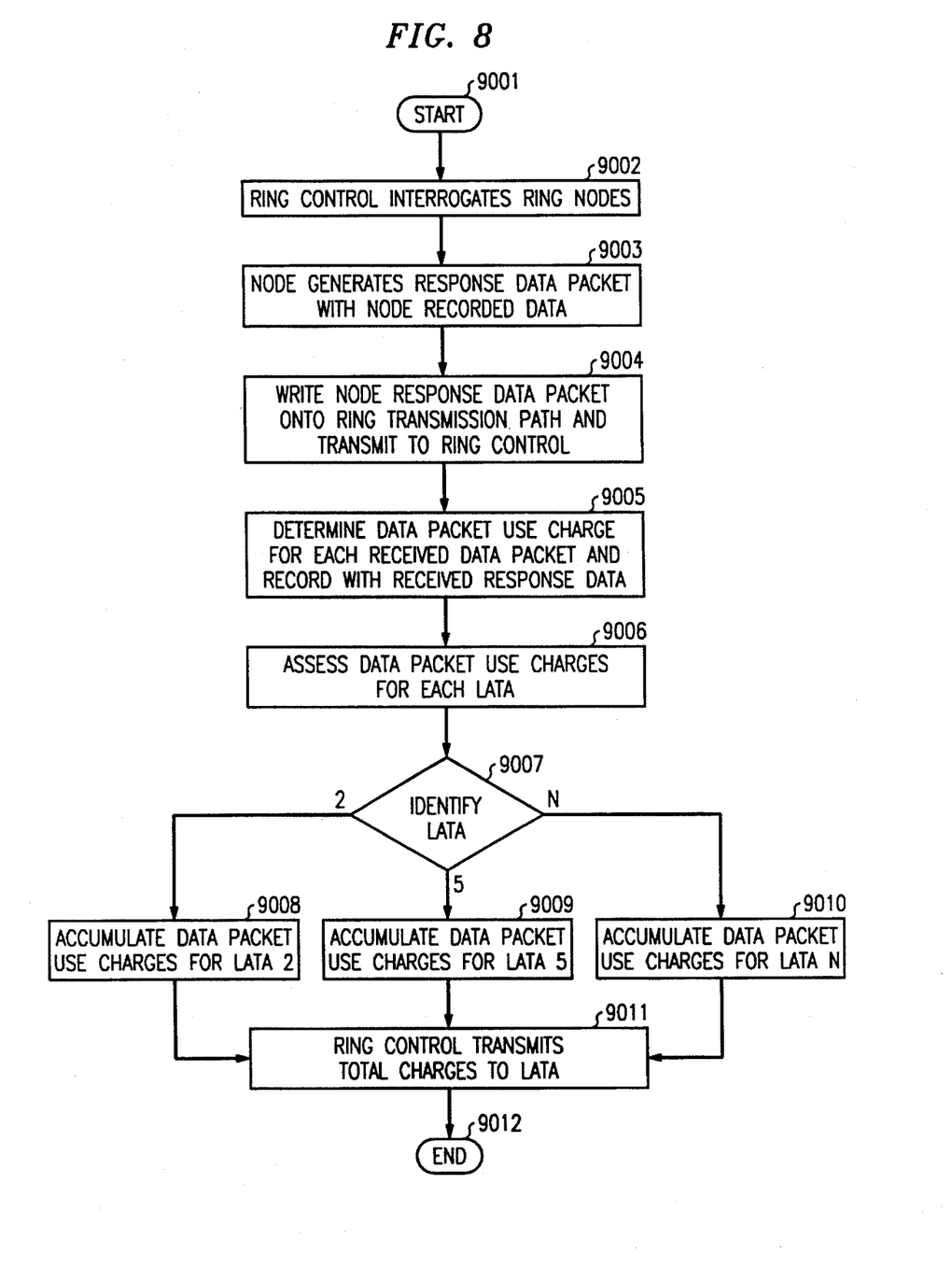

Upon receiving each node response data packet, ring control 105, FIG. 8, step 9005, ascertains if the node assessed a packet use charge to a received node record. In the event that a node did not assess the packet use charge, ring control 105, FIG. 8, step 9006, determines the appropriate packet use charge for each node record, assesses the charge against the node record and stores the assessed charge with the received node record information in a storage device 604, 605, 606 of ring control 105.

Figure 6:
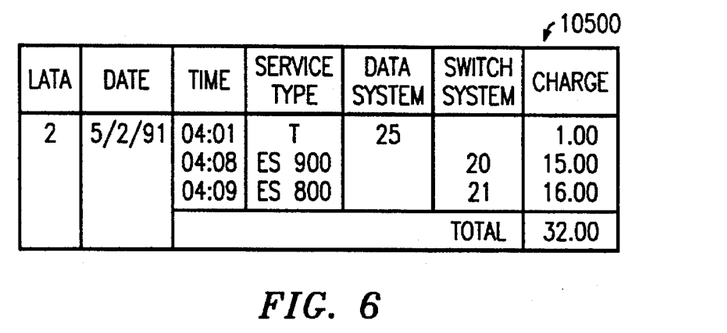

In preparation of a LATA packet use charges, FIG. 8, steps 9007, 9008, 9009, 9010, ring control 105 identifies the LATA, for example LATA 2, step 9008, and accumulates a total of the determined and assessed data packet apparatus use charges incurred by each data system 25 and switching system 20, 21 of LATA 2 to be billed to LATA 2 for data packet use of apparatus 10. In accumulating the LATA packet use charges, FIG. 6, ring control 105 reads the stored identity of LATA 2 into the central processor unit along with the data and time that each data packet was received by nodes connected with LATA 2. Thus, LATA record 10500 is a record for LATA 2 indicating that data packets were received by nodes at 0401 AM, 0408 AM and 0409 AM on May 2, 1991. LATA 2 record 10500 further identifies that the data packet received at 0401 AM was originated by data system 25 and requested transport service for which a charge of $1.00 was assessed for packet use of apparatus 10. The data packets received at times 0408 and 0409 AM from LATA 2 switching systems 20 and 21, respectively, requested 800 and 900 enhanced services which were assessed packet use charges of $15.00 and $16.00. Ring control 15 accumulates a total of $32.00 assessed dam packet apparatus use charges incurred by each data and switching system of LATA 2 to be billed for data packet use of the apparatus 10 and transmits the total bill to LATA 2, FIG. 8, step 9011.

Similarly, packet use information is read from each node, FIG. 1, into ring control 105 and accumulated for each LATA for packet use incurred by each data and switching system and transmitted to the appropriate LATA.

We claim:

1. Apparatus for transporting data packets received from data systems located in telephone local access transport areas and for implementing enhanced services to control operation of a telephone local access transport area switching network to interconnect calling and called parties comprising:

means for terminating data links interconnecting the apparatus with at least one of said data systems and switching systems of telephone local access transport areas, means, responsive to receipt of data packets from data systems requesting transport of the data packets to a destination data system and from switching systems requesting enhanced services, for assessing charges for use of the apparatus based on each received data packet in accordance with transport and enhanced service requests of each received data packet, means coupled with said terminating and assessing means for accumulating a total of said charges incurred by at least one telephone local access transport area to be billed for data packet use of the apparatus, means, responsive to receipt of said data packets for transporting ones of the data packets to the destination data system, for generating other data packets identifying telephone switch interconnection information required to control telephone local access transport area switching systems to interconnect the calling and called parties in accordance with the enhanced services and transmitting the generated data packets over one of the data links to the telephone local access transport area switching network.

2. The transporting and enhanced service implementing apparatus set forth in claim 1 wherein said terminating and assessing means comprises local processing means, coupled with the data links and responsive to receipt of a data packet, for identifying requested transport and enhanced services and identity of said at least one from which the data packet was received.

3. The transporting and enhanced service implementing apparatus set forth in claim 2 wherein said local processing means comprises means for recording said transport and enhanced service requests and said at least one identity for data packets received during a predetermined interval of time.

4. The transporting and enhanced service implementing apparatus set forth in claim 3 wherein said accumulating means comprises central processing means coupled with said local processing means for interrogating said recording means during said predetermined interval of time and storing said recorded transport and enhanced service requests and telephone local access transport area data and said at least one's identity into storage apparatus of said central processing means.

5. The transporting and enhanced service implementing apparatus set forth in claim 4 wherein said central processing means comprises means for accumulating a total of said assessed data packet apparatus use charges incurred by said at least one to be billed to the telephone local access transport area for data packet use of the apparatus.

6. The transporting and enhanced service implementing apparatus set forth in claim 1 wherein said apparatus comprises a network having a plurality of nodes interconnected by transmission paths with ones of the nodes for terminating data links interconnecting said at least one with the network and with other ones of the nodes for terminating data links interconnecting enhanced service control apparatus with the network.

7. Apparatus for transporting data packets between data systems located in telephone local access transport areas and for implementing enhanced services to control operation of a telephone local access transport area switching network to interconnect calling and called parties comprising:

means for terminating data links each interconnecting the apparatus with data systems of said of telephone local access transport areas and switching systems of a telephone local access transport area switching network, means, coupled with said means for terminating data links, for identifying transport and enhanced service requests and telephone local access transport area data systems and switching systems that generate a received data packet, and means for recording said transport and enhanced service requests and said telephone local access transport area data system and switching system identities for data packets received during a predetermined interval of time, processing means coupled with said identifying and recording means for interrogating said identifying means and recording means during said predetermined interval of time and storing said recorded transport and enhanced service requests and telephone local access transport area data systems and switching system identities on storage apparatus of said processing means, means for determining a charge for use of the apparatus by each received packet data in accordance with the stored transport and enhanced service requests and telephone local access transport area data and switching system identities and assessing the determined charge against each received data packet, means coupled to said determining means for accumulating a total of said assessed data packet apparatus use charges incurred by each data system and switching system of said telephone local access transport areas to be billed to the telephone local access transport area for data packet use of the apparatus, and means, coupled with said identifying means and recording means and responsive to receipt of a transport data packet requesting transport, for transmitting the transport data packet over said data links to telephone local access transport area destination data system and to receipt of a data packet requesting an enhanced service for generating another data packet identifying telephone switch interconnection information required to control said telephone local access transport area switching systems to interconnect calling and called parties in accordance with the enhanced service and transmitting the generated data packet over the data links to the telephone local access transport area switching network.

8. Apparatus for transporting data packets between data systems located in telephone local access transport areas and for implementing enhanced services to control operation of a telephone local access transport area switching network to interconnect calling and called parties comprising:

data links each interconnecting said data systems of telephone local access transport areas and switching systems of a telephone local access transport area switching network with the apparatus, means, coupled with the data links and responsive to receipt of data packets incoming on said data links, for identifying transport and enhanced service requests, said data systems and switching systems having generated the incoming data packet, and means for recording said transport and enhanced service requests and said data system and switching system identities for data packets received during a predetermined interval of time, processing means coupled with said identifying and recording means for interrogating said identifying and recording means during said predetermined interval of time and storing said recorded transport and enhanced service requests and data system and switching system identities into storage apparatus of said processing means, means for determining a charge for use of the apparatus by each received data packet in accordance with the stored transport and enhanced service requests and data system and switching system identities and assessing the determined charge against each received data packet, means coupled to said determining means for accumulating a total of said use charges incurred by each data system and switching system of a telephone local access transport area to be billed to an owner of the telephone local access transport area for data packet use of the apparatus, and means coupled with said identifying and recording means and responsive to receipt of a transport data packet requesting transport for transmitting the transport data packet over the data links to a destination data system of said data systems and to receipt of a data packet requesting an enhanced service for generating another data packet identifying telephone switching interconnection information required to control said telephone local access transport area switching system to interconnect calling and called parties in accordance with the enhanced service and transmitting the other data packet over said data links on the telephone local access transport area switching network.

9. A network for implementing enhanced services to control operation of switching systems to interconnect calling and called parties wherein the network has nodes interconnected by transmission paths for enabling data systems and switching systems connected with the nodes to exchange data packets with the network comprising:

data links each interconnecting the data systems and switching systems of a telephone local access transport area switching network with one of the nodes, node processing means, coupled with the data links and responsive to receipt of data packets incoming on said data links, for recording transport and enhanced service requests and identities of data systems and switching systems having generated the received data packet, means, coupled with said node processing means and responsive to receipt of a transport data packet requesting transport, for transmitting the transport data packet over the data links to a telephone local access transport area destination data system, and means responsive to receipt of a data packet requesting an enhanced service, for generating another data packet identifying telephone switch interconnected information required to control a telephone local access transport area switching system to interconnect calling and called parties in accordance with the enhanced services and transmitting the other data packet over the data links to the telephone local access transport area switching network, and network processing means, coupled by a transmission path with said node processing means, for interrogating said node processing means and for determining a charge for use of the network by each received data packet in accordance with the stored transport and enhanced service requests and data system and switching system identities and assessing the determined charge against each received data packet and for accumulating a total of said assessed use charges incurred by each data system and switching system of a telephone local access transport area to be billed to the telephone local access transport area for data packet use of the network.

10. A method of operating apparatus for implementing transport and enhanced services for telephone local access transport area data systems and switching systems connected by data links with nodes of the apparatus comprising steps of:

receiving data packets at the nodes from at least one of originating data systems and switching systems and recording requests therein for transport of data packets to a destination system and an enhanced service of a switching system for interconnection information required to control the switching systems to interconnect calling and called parties in accordance with the requests, and assessing charges at the node for use of the apparatus based on received data packets in accordance with transport and enhanced service requests and identify of said at least one, and accumulating a total of said charges at a central processor incurred by said at least one to be billed to the telephone local access transport area for data packet use of the apparatus, transporting ones of the data packets to the destination system and generating other data packets identifying interconnection information required to control telephone local access transport area switching systems to interconnect the calling and called parties in accordance with the requests and transmitting the generated data packets over the data links to the telephone local access transport area switching systems.

11. The method of operating apparatus for implementing transport and enhanced services set forth in claim 10 wherein said receiving step comprises the step of identifying requested transport and enhanced services and identity of said at least one having generated a data packet at a node from data of the received data packet.

12. The method of operating apparatus for implementing transport and enhanced services set forth in claim 11 wherein said receiving step also comprises the step of recording said transport and enhanced service requests and said at least one identity for data packets received at the node during a predetermined interval of time.

13. The method of operating apparatus for implementing transport and enhanced services set forth in claim 12 wherein said assessing and accumulating step comprises the step of interrogating the node during the predetermined interval of time and storing said node recorded transport and enhanced service requests and said recorded transport and switching system identities in storage apparatus of central control processing apparatus.

14. The method of operating apparatus for implementing transport and enhanced services set forth in claim 13 wherein said assessing and accumulating step comprises the step of determining a charge for use of the apparatus by each received data packet in accordance with the stored transport and enhanced service requests and the transport and switching system identities and assessing the determined charge against each received data packet.

15. The method of operating apparatus for implementing transport and enhanced services set forth in claim 14 wherein said assessing and accumulating step comprises the step of accumulating a total of the determined and assessed data packet apparatus use charges incurred by said at least one of a telephone local access transport area to be billed to the telephone local access transport area for data packet use of the apparatus.

16. A method of operating apparatus for implementing transport and enhanced services for telephone local access transport area data systems and switching systems connected by data links with nodes of the apparatus comprising steps of:

receiving, at said nodes, data packets conveying transport and enhanced service requests identifying said data and switching systems from which said data packets were received, recording said identified transport and enhanced service requests and said data systems and switching systems identities for said data packets received at one of the nodes during a predetermined interval of time, interrogating the node during the predetermined interval of time and storing said recorded transport and enhanced service requests and said transport and switching systems identities in storage apparatus of a central processor, determining a charge for use of the apparatus by each received data packet in accordance with the recorded transport and enhanced service requests and the transport and switching systems identities and assessing the determined charge against each received data packet, accumulating a total of the use charges incurred by each data system and switching system of a telephone local access transport area to be billed to the telephone local access transport area for data packet use of the apparatus, transporting ones of the data packets to a destination data system and generating other data packets identifying interconnection information required to control telephone local access transport area switching systems to interconnect the calling and called parties in accordance with the identified enhanced service requests and transmitting the generated other data packets over one of the data links to the identified telephone local access transport area switching systems.

* * * * *